Oct. 8, 1935.                R. E. MOORE                2,016,683
                           FISHING TOOL
                        Filed May 21, 1934                2 Sheets-Sheet 2
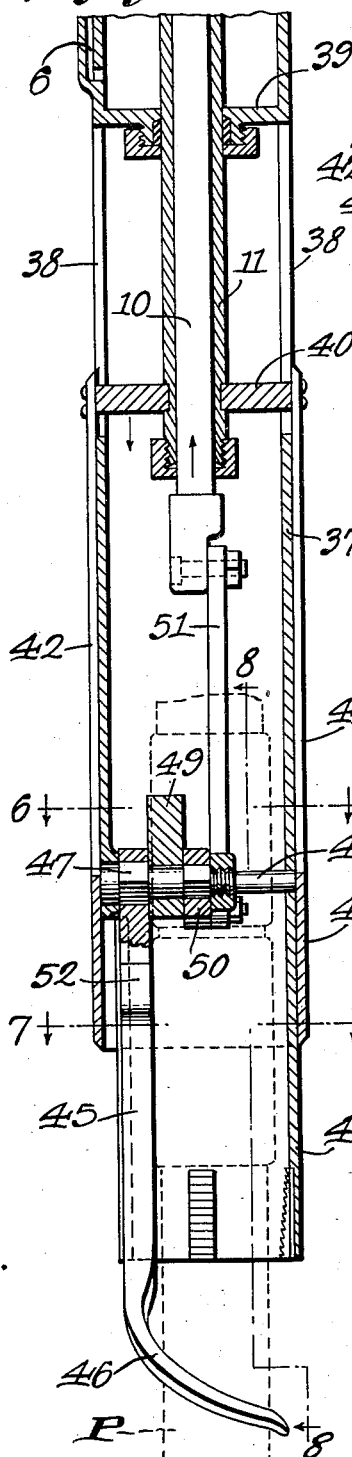
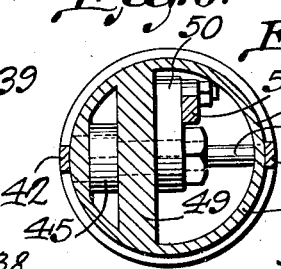
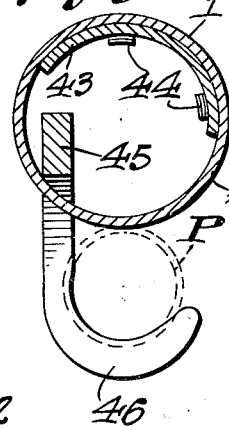
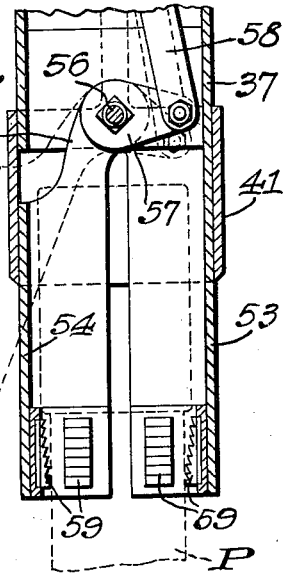
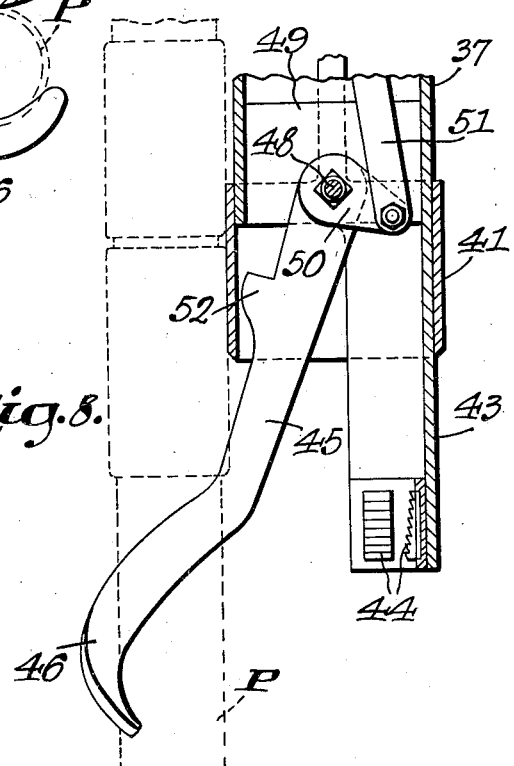
R. E. Moore  Inventor
By C. A. Snow & Co.
Attorneys.

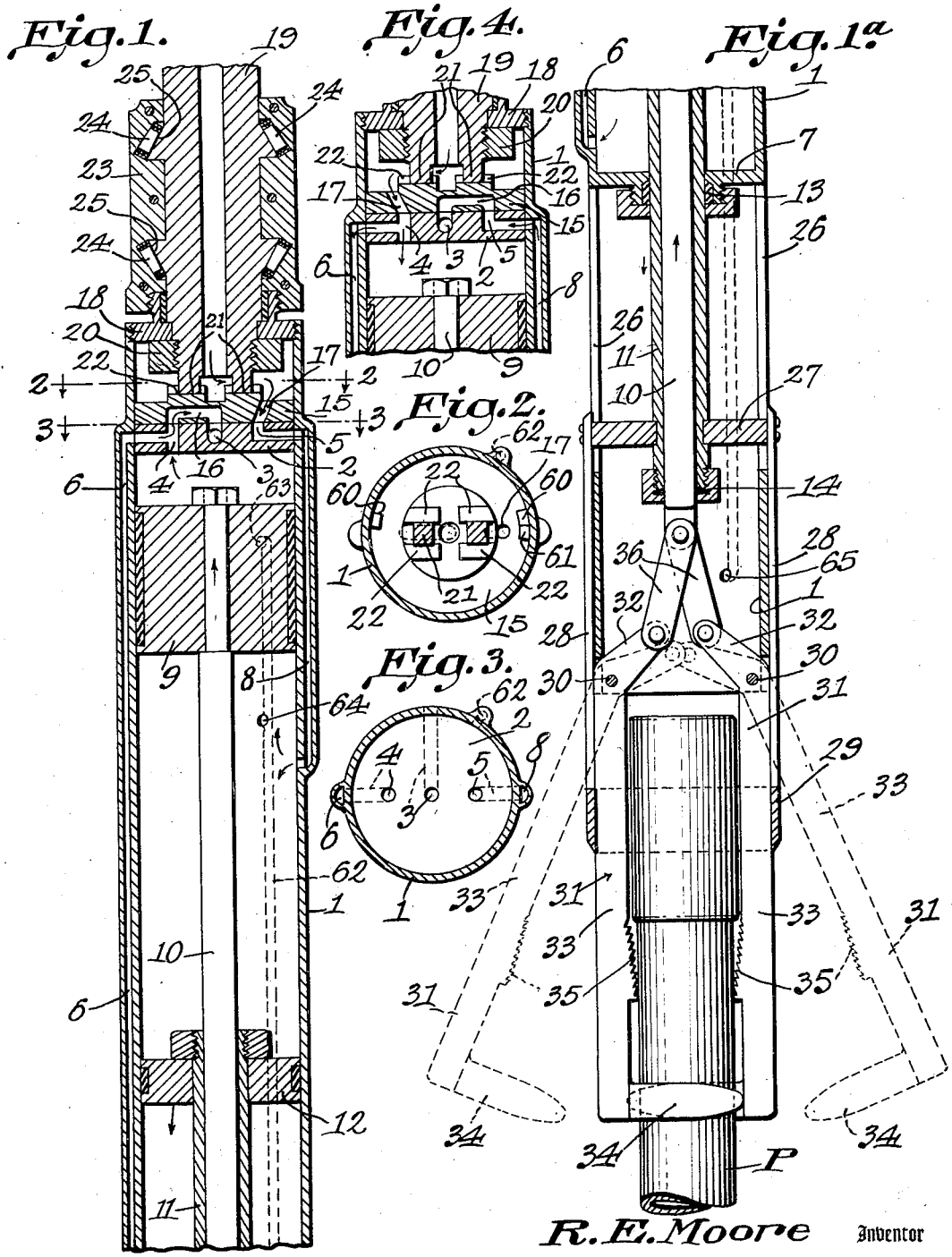

Patented Oct. 8, 1935

2,016,683

UNITED STATES PATENT OFFICE 2,016,683

FISHING TOOL

Ralph E. Moore, Hattiesburg, Miss., assignor to Alfred S. Black, trustee for Oil Well Recovery Corporation, Hattiesburg, Miss.

Application May 21, 1934, Serial No. 726,856

11 Claims. (Cl. 294—88)

This invention relates to fishing tools of that type employed for recovering lost pipes and rods from oil wells and the like.

It is an object of the invention to provide a tool of this character the grappling members of which are operated by fluid under pressure, the operation being controlled from above the surface of the ground.

A further object is to provide a valve for controlling the fluid from the circulating pump, said valve being manipulated by the rotation of the main drill stem relative to the tool.

A still further object is to utilize pistons mounted for reciprocation whereby the grappling members can be caused to grip a pipe or the like not positioned therebetween and thereafter locked in gripping positions, it being possible by means of the same pistons, to successively unlock the arms and release the engaged device.

Another object is to provide a fishing tool the movable gripping member or members of which can be shifted to provide a clearance therebetween greater than the diameter of the well itself, whereby the tool can more readily locate and adjust itself to lost pipes or the like than where less expansion is possible.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a central longitudinal section through the upper portion of the fishing tool, a portion of the main drill stem being shown in connection therewith.

Figure 1a is a similar view showing the lower portion of the fishing tool, the gripping elements being shown by full lines locked in engagement with a pipe, one of the open or expanded positions of said elements being indicated by broken lines.

Figure 2 is a section on line 2—2, Figure 1.

Figure 3 is a section on line 3—3, Figure 1.

Figure 4 is a central longitudinal section through the valve portion of the tool showing the valve shifted to reverse the direction of flow of fluid within the tool.

Figure 5 is a central longitudinal section through the lower portion of a modified form of tool.

Figure 6 is a section on line 6—6, Figure 5.

Figure 7 is a section on line 7—7, Figure 5.

Figure 8 is a section on line 8—8, Figure 5, a portion of the gripped pipe being shown in position when the movable gripping element is used as a wall hook.

Figure 9 is a longitudinal section through the lower portion of another form of the tool.

Referring to the figures by characters of reference, 1 designates the elongated cylindrical body of the fishing tool and secured within this body below but adjacent to its upper end is a stationary valve member in the form of a disk 2 having a central exhaust port 3 opening through the top thereof and through the wall of the body. Additional ports 4 and 5 also open through the top of the disk 2 and are preferably though not necessarily diametrically opposed. The port 4 opens downwardly through the disk 2 and laterally into a by-pass 6 which extends along the wall of body 1 and opens thereinto above and adjacent to a cylinder head 7. The port 5 is extended laterally in the disk 2 and opens into a by-pass 8 which extends downwardly along the wall of the body and opens into the upper portion thereof.

A piston 9 is mounted for reciprocation in the body 1 between the lower end of by-pass 8 and the stationary valve disk or head 2 and this piston has a rod 10 extending downwardly through a tubular piston rod 11 carried by another piston 12. This latter piston is mounted for reciprocation between the lower end of by-pass 8 and the lower end of by-pass 6. Both the tubular piston rod 11 and the inner piston rod 10 are extended through the bottom head 7 of the tool body where they are suitably packed as shown at 13 to prevent leakage of fluid under pressure. Piston rod 10 projects below the tubular rod 11 and a suitable packing is provided at 14 to prevent leakage of fluid between the two rods adjacent to their ends.

Supported on the stationary valve member 2 is a rotatable valve member in the form of a disk 15. This disk has an exhaust port 16 opening through the bottom thereof at the center where it constantly registers with port 3. The other end of the exhaust port 16 also opens through the bottom of disk 15 at a point where it can be brought into register with either port 4 or port 5.

An outlet port 17 is extended through the rotatable valve member 15 and is so located that when exhaust port 16 is in communication with port 4, said port 17 will be in register with port 5 and, when the position of the valve member 15 is reversed, the positions of these registering ports will be likewise reversed.

The upper end of the tool body 1 is closed by a head 18 in which the lower portion of a tubular drill stem 19 is mounted for rotation. This stem is held against withdrawal from the tool body by a nut 20 mounted thereon below the head 18. The lower end of the stem 19 has spaced lugs 21 extending therefrom which do not interfere with the flow of fluid from stem 19 into body 1 between valve disk 15 and head 18. These lugs engage with recessed lugs 22 carried by the valve member 15. Thus when stem 19 is rotated relative to the body 1 the interfitting lugs 21 and 22 will cause the valve member 15 also to rotate relative to the body 1 and relative to the valve member 2. Consequently the positions of the ports can be changed so as to direct fluid under pressure from the main drill stem 19 into either of the by-passes 8 or 6.

For the purpose of supporting the weight of the tool so that it will not interfere seriously with the rotation of the drill stem relative thereto, a split bearing sleeve 23 is connected to and extends upwardly from the head 18. This sleeve carries conical roller bearings 24 which cooperate with tapered bearing surfaces 25 extending around the drill stem, thereby to support the weight of the load and insure easy relative rotation of the stem 19 and body 1.

That portion of the tool body located below the head 7 is formed with longitudinal slots 26 which are oppositely disposed and constitute guide ways for the end portions of a cross head 27. This cross head is secured to and adapted to move with the tubular piston rod 11 and the outer ends of the cross head are connected by arms 28 to a locking ring 29 which is slidably mounted on the lower end portion of the body 1.

Secured within the lower end portion of the body 1 are parallel pivot pins 30 and fulcrumed on each of these pins is a gripping member 31 having a short upwardly extending arm 32 and a relatively long downwardly extending arm 33. Arm 33 has laterally extending hooks 34 and these hooks are adapted to lap and frictionally engage opposed portions of a pipe or the like to which it is applied.

As a further means for gripping and holding an engaged pipe each of the arms 33 is preferably formed with a toothed jaw 35. The upper arms 32 are connected by links 36 to the lower end of the piston rod 10.

When it is desired to use the tool for the purpose of removing a lost pipe or the like the stem 19 is rotated relative to the tool body 1 so as to rotate valve member 15 and bring the ports to the positions shown in Figure 1. Thus any fluid admitted to the upper portion of the body 1 from the drill stem 19 will be conducted to and through by-pass 8 and enter the body between the pistons 9 and 12. This will cause the piston 9 to move upwardly and pull through its rod 10 and links 36 upon arms 32, thereby causing arms 33 to swing toward each other. Likewise piston 12 will be thrust downwardly and force the ring 29 along arms 33 so as to lock them against outward swinging movement.

The main drill stem 19 is connected to a circular pump or "mud hog" and after the pistons have been actuated as described the pressure can be cut off and the tool lowered into the well until it comes against or in close proximity to the pipe or rod to be lifted. Thereafter the circulating fluid is directed under pressure into the drill stem and said stem is rotated until the positions of the ports are reversed. This results in placing by-pass 8 in communication with the exhaust while fluid under pressure is admitted to port 4 and by-pass 6. Consequently this fluid will act to move piston 12 upwardly, thereby raising ring 29, and immediately thereafter piston 9 will be thrust downwardly and transmit motion through rod 10 and links 36 to arm 32, thereby causing arms 33 and hooks 34 to swing apart. The tool can now be moved about within the well until the hooks and arms have been positioned where they can grip the pipe P or the like to be raised. As soon as it has been ascertained that the parts are thus located, stem 19 is again rotated to bring the valve ports from the relative positions shown in Figure 4 back to the positions shown in Figure 1. Thus hooks 34 will be pressed tightly against opposed portions of the pipe and ring 29 will be lowered onto the arms 33 to fasten the hooks in pipe-engaging positions. The tool can now be drawn up and will carry the engaged pipe with it.

As the arms and hooks are locked by ring 29 there is no danger of the pipe being released accidentally.

While it is advantageous under some conditions to employ a fishing tool both gripping members of which are movably mounted, a modified form of tool such as shown in Figures 5 to 8 inclusive might be employed. This tool has only a single movable gripping member, the same being adapted to cooperate with a fixed gripping member.

Referring to said figures it will be noted that the lower portion of the tool body 37 is not slotted. Instead said body has relatively short slots 38 extending downwardly from the lower head 39 which corresponds with head 7. These short slots receive the cross head 40 connected to the tubular piston rod 11. The locking ring 41 which is slidable on the lower portion of the body 38 is connected by arms 42 to the cross head 40.

Extending from the body 38 so as to constitute a continuation thereof is a gripping member 43 arcuate in transverse section and provided with one or more toothed jaws 44 on its inner surface. A movable gripping member is adapted to cooperate with this stationary member and includes an arm 45 terminating in a hook 46 so shaped and proportioned that, under many conditions, it can be used as a wall hook. This arm 45 is mounted on the squared portion 47 of a pin 48 which extends diametrically across the lower end portion of the body 37 and is journalled at its ends in the wall of said body and, at an intermediate point, in a cross bar 49 carried by the body. A short arm 50 is secured to and rotates with the pin and is connected by a link 51 to the piston rod 10.

When the rod 10 is thrust downwardly and the ring 41 is pulled upwardly by the admission of fluid under pressure to the upper and lower portions of body 37 the hook 46 will be swung laterally beyond the position shown in Figure 8, it being understood that ring 41 in said figure is not shown at its extreme elevation. The tool can then be manipulated until the hook has been placed partly around the pipe or like to be drawn. The flow of fluid within the tool is then reversed by rotating the drill stem as heretofore described so that link 51 will pull upwardly on arm 50 and swing hook 46 toward the pipe P.

If the upper end of the pipe is above the lower end of body 37, as shown in Figures 5 and 8, the hook will act to bind the pipe against the outer surface of the tool body with sufficient pressure to hold it while being elevated. Should the upper end of the pipe P be located between gripping member 43 and hook 46 said hook, when actuated, will clamp the pipe P against the jaws 44 on member 43 with sufficient pressure to permit it to be lifted.

For the purpose of preventing the ring 41 from dropping too soon while the tool is fishing for the pipe, a stop lug 52 can be extended from arm 45 so as to project into the path of the ring when the hook 46 is swung outwardly its maximum distance. Thus when the hook is swung toward member 43 the ring 41 will not be released until after lug 52 has been withdrawn from the path thereof.

Instead of providing a gripping member in the form of a wall hook as shown in Figures 5 to 8 inclusive, two opposed members arcuate in cross section can be used as shown in Figure 9. In this modified structure a gripping member 53 corresponding with the member 43 is used and constitutes a continuation of the body 37. The movable member 54 is similar in shape to the stationary member 53 but is disposed oppositely thereto. It has an arm 55 extending upwardly from one side thereof and secured to a rotatable pin 56 which corresponds with the pin 48. This pin has an arm 57 adapted to be connected by a link 58 to the piston rod 10 heretofore described.

Both of the members 53 and 54 are provided with toothed gripping jaws 59 for engaging a pipe or the like.

The tool illustrated in Figure 9 can be used in the same manner as the one illustrated in Figures 1 to 4 inclusive with the exception that only one of the gripping members can be swung outwardly into expanded position for receiving the pipe to be removed.

If desired the rotation of the valve member 15 relative to the body 1 and valve member 2 can be limited by stops 60 extending inwardly from the body 1 and adapted to be engaged by a movable stop 61 carried by the valve member 15. These are shown in Figure 2. When such stops are used the operator manipulating the stem 19 will know definitely when the ports have been brought properly into register.

It is to be understood that in practice the fishing tool is lowered into the hole to position at the side of the lost pipe or past the top end thereof so as to come into contact therewith. When the hook thus arrives in contact with the pipe it is in open position. The valve is then changed so that fluid pressure will be applied to cause the hook to engage the pipe then press it toward the main body of the tool. While the tool is being elevated thereafter by the drill stem the main body of the tool will ultimately pass the top of the pipe at which time the hook will act to draw the pipe under the center of the tool body whereupon the lug on the hook will release the locking ring and permit it to move downwardly to locking position. Thus it is not necessary for the operator to know the exact location of the top of the lost pipe.

In all forms of the tool herein described it is desirable to use a circulating by-pass such as shown, for example, at 62 in Figures 1 and 1a. This by-pass has a port 63 above the piston 9 and another port 64 below the piston. An outlet 65 is provided adjacent to the lower end of the body 1. By using this by-pass fluid under pressure is at all times free to circulate within the tool, it being understood that when piston 9 is moved downwardly it opens port 63 and closes port 64, thereby to allow excess fluid under pressure to flow to the port 65. When piston 9 is raised it closes port 63 and opens port 64 so that fluid under pressure still can circulate by way of port 65.

What is claimed is:

1. In a fishing tool a tool body, a drill stem rotatably connected thereto, separate actuating means in the body operated by fluid under pressure, a gripping member movably connected to the body and to one actuating means, a locking member therefor movably connected to the body and to the other actuating means, and means operated by the rotation of the stem relative to the body for controlling the flow of fluid under pressure to said actuating means.

2. In a fishing tool a tool body, a drill stem rotatably connected thereto, separate actuating means in the body operated by fluid under pressure, opposed gripping members movably connected to the body and to one actuating means, a locking member slidable on the body and gripping members and connected to the other actuating means, and means operated by the rotation of the stem relative to the body for controlling the flow of fluid under pressure to said actuating means.

3. In a fishing tool a tool body, a drill stem rotatably connected thereto, separate actuating means in the body operated by fluid under pressure, a stationary gripping member extending from the body, a movable gripping member connected to the body and to one of said actuating means, a locking member for the movable gripping member and movably connected to the body and to the other actuating means, and means operated by the rotation of the stem relative to the body for controlling the flow of fluid under pressure to said actuating means.

4. In a fishing tool a tool body, a rotatable tubular drill stem for supplying fluid under pressure to the body, separate actuating means in the body operated by fluid under pressure, opposed gripping members movably connected to the body and to one actuating means, a locking member slidable on the body and gripping members and connected to the other actuating means, and means operated by the rotation of the stem relative to the body for controlling the flow of fluid under pressure to said actuating means.

5. In a fishing tool a tool body, a rotatable tubular drill stem for supplying fluid under pressure to the body, separate actuating means in the body operated by fluid under pressure, a stationary gripping member extending from the body, a movable gripping member connected to the body and to one of said actuating means, a locking member for the movable gripping member and movably connected to the body and to the other actuating means, and means operated by the rotation of the stem relative to the body for controlling the flow of fluid under pressure to said actuating means.

6. In a fishing tool a tool body, a tubular drill stem for supplying fluid thereto under pressure, separate pistons mounted for reciprocation in the body, a valve in the body and shiftable relative thereto by the drill stem, means controlled by the valve when moved to one position for shifting the pistons toward each other with fluid under pressure and, when moved to another position, for shifting the pistons from each other by fluid under pressure, a gripping member movably connected to the body and to one of the pistons, and a locking element for said member connected to and actuated by the other piston.

7. In a fishing tool a tool body, a tubular drill stem for supplying fluid thereto under pressure, said stem being rotatable relative to the body, separate pistons in the body, means controlled by the stem when rotated in one direction relative to the body, for directing fluid under pressure against the pistons to move them toward each other and, when the stem is rotated in the opposite direction, for directing fluid against the pistons to move them apart, a gripping member movably connected to the body and to one of the pistons, and a movable locking member connected to the body and to the other piston.

8. A fishing tool including a tool body, a tubular drill stem for supplying fluid to the body under pressure, said stem being rotatable relative to the body, separate pistons in the body, a valve in the body having a member connected to and rotatable with the drill stem, means controlled by the valve when in different positions, for directing fluid under pressure against the pistons to move them toward and from each other respectively, a gripping member movably connected to the body and to one of the pistons, and a movable locking member connected to the body and to the other piston.

9. In a fishing tool a tool body, a tubular drill stem for supplying fluid thereto under pressure, said stem being rotatable relative to the body, a valve in the body and movable with the stem for controlling the flow of fluid within the body, separate pistons within the body for actuation by the fluid in opposite directions respectively, a locking ring movably mounted on the body and connected to one of the pistons, a gripping arm pivotally connected to the body and to the other piston, and means on said arm for retarding the movement of the ring into locking position.

10. In a fishing tool, a tool body, a tubular drill stem for supplying fluid thereto under pressure, said stem being rotatable relative to the body, a valve in the body and movable with the stem for controlling the flow of fluid within the body, separate pistons within the body for actuation by the fluid in opposite directions respectively, a locking ring movably mounted on the body and connected to one of the pistons, and a gripping arm pivotally connected to the body and to the other piston.

11. In a fishing tool a tool body constituting a cylinder, separate pistons therein, interfitting relatively movable piston rods extending from the body, a movable gripping member pivotally connected to the body and to one of the piston rods, a locking ring movably mounted on the body and connected to the other piston rod, a drill stem connected to the body for supplying fluid under pressure thereto, said stem and body being relatively rotatable, and means controlled by the relative rotation of the stem and body for controlling the flow of fluid under pressure against the pistons thereby to move the pistons toward and from each other.

RALPH E. MOORE.